July 18, 1933.  W. M. ROBINSON  1,918,715
METHOD OF MAKING PIPE FITTINGS
Filed July 2, 1931  2 Sheets-Sheet 1
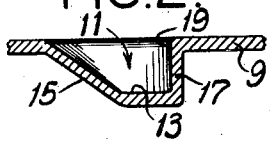
FIG.2.
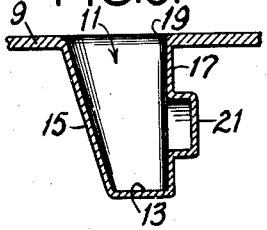
FIG.6.
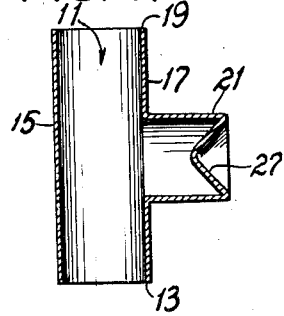
FIG.10.
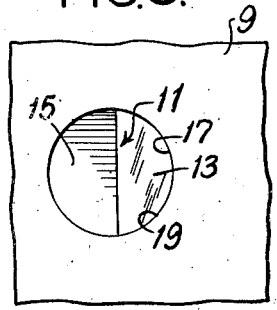
FIG.3.
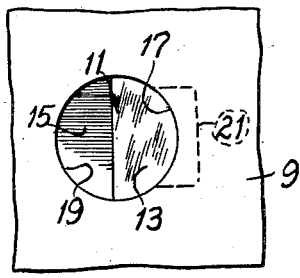
FIG.7.
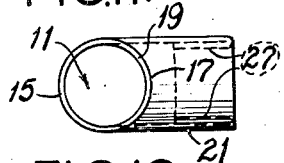
FIG.11.
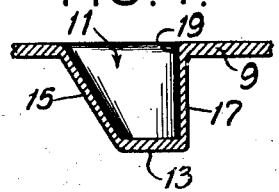
FIG.4.
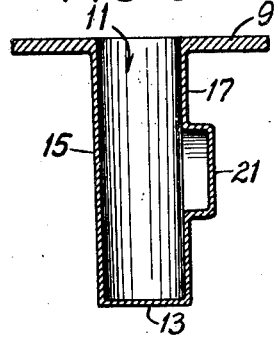
FIG.8.
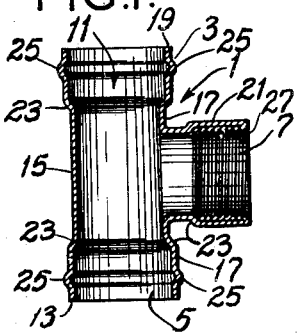
FIG.12.
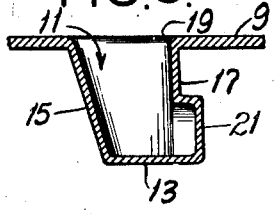
FIG.5.
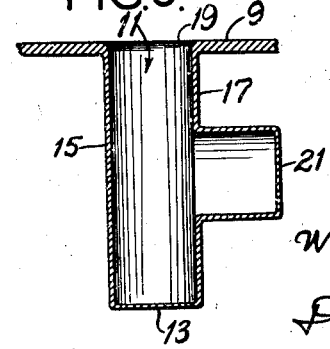
FIG.9.
FIG.1.
Ward M. Robinson,
Inventor,
Delos G. Haynes,
Attorney.

July 18, 1933.   W. M. ROBINSON   1,918,715
METHOD OF MAKING PIPE FITTINGS
Filed July 2, 1931   2 Sheets-Sheet 2

Ward M. Robinson,
Inventor,
Delos G. Hayes,
Attorney.

Patented July 18, 1933

1,918,715

UNITED STATES PATENT OFFICE

WARD M. ROBINSON, OF PORT HURON, MICHIGAN, ASSIGNOR TO MUELLER BRASS CO., OF PORT HURON, MICHIGAN, A CORPORATION OF MICHIGAN

METHOD OF MAKING PIPE FITTINGS

Application filed July 2, 1931. Serial No. 548,290.

This invention relates to pipe fittings and the manufacture thereof and with regard to certain more specific features to seamless fittings formed from sheet metal.

Among the several objects of the invention may be noted the provision of pipe fittings of a seamless character formed from sheet metal; the provision of pipe fittings of the class described which are in most part light and thin-walled but which are provided with reenforced parts; the provision of a method of manufacturing fittings of the class described, said method being adapted to produce numerous types of such fittings in an economical manner. Other objects will be in part obvious and in part pointed out hereinafter.

The invention accordingly comprises the elements and combinations of elements, steps and sequence of steps which will be exemplified in the product and method hereinafter described, and the scope of the application of which will be indicated in the following claims.

In the accompanying drawings, in which are illustrated several of various possible embodiments of the invention, Fig. 1 is an axial section of a seamless fitting formed from sheet metal by one of the methods of the invention;

Fig. 2 is a vertical section of a stamping at an early stage in the formation of the fitting of Fig. 1;

Fig. 3 is a top plan view of the stamping of Fig. 2;

Fig. 4 is a view similar to Fig. 2 but showing the stamping further drawn out;

Figs. 5 and 6 are views similar to Fig. 4 but showing more advanced stages of the formation;

Fig. 7 is a top plan view of the stamping of Fig. 6;

Figs. 8 and 9 are views similar to Figs. 5 and 6 but showing respectively advancing stages of the operation;

Fig. 10 is a view similar to Fig. 9 but showing the fitting after a trimming operation;

Fig. 11 is a top plan view of the fitting of Fig. 10, but showing a certain reenforcing operation completed;

Fig. 12 is a view similar to Fig. 10 but showing the fitting of Fig. 1 after it has been partially shaped into its final form;

Figure 21:
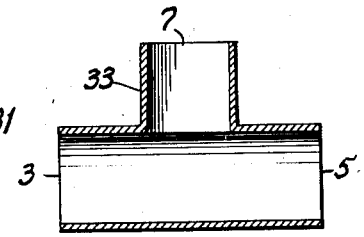
Figure 15:
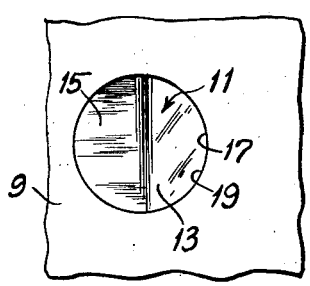
Fig. 15 is a top plan view of the stamping of Fig. 14.
Figure 22:
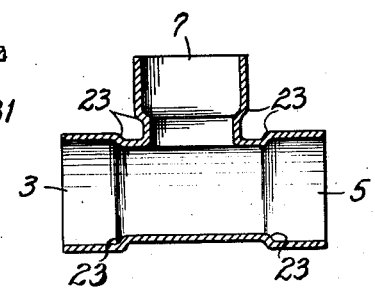
Figure 20:
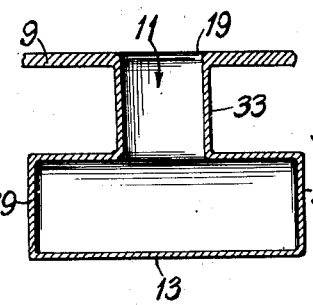
Figure 13:
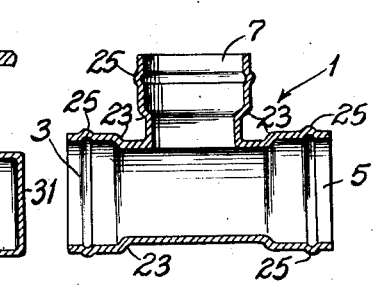
Fig. 13 shows a fitting similar to the fitting of Fig. 1, but without certain reenforced portions, and formed by a modified method of the invention.
Figure 17:
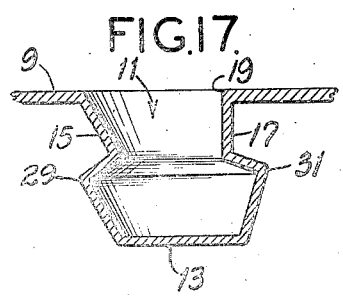

Figs. 16 through 20 respectively show advancing stages of the formation of fitting of Fig. 13;

Fig. 21 shows the fitting of Fig. 20 after a trimming operation;

Fig. 22 is a view showing the fitting of Fig. 21 after a forming operation; and

Figure 23:
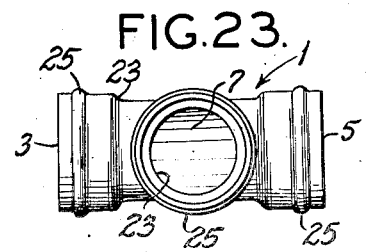

Fig. 23 is a top plan view of the fitting shown in Fig. 13.

Similar reference characters indicate corresponding parts throughout the several views of the drawings.

Referring now more particularly to Fig. 1, there is shown at numeral 1 a fitting formed from sheet metal adapted to connect piping or tubing for service conduit for water, electrical, plumbing or gas work. This fitting comprises a T-fitting which preferably is of the general type disclosed in the Hill United States Patent 1,770,852, the Gresley United States Patent 1,776,502, and the Mueller United States Patent 1,801,171. The fitting 1 has two oppositely disposed receiving portions 3 and 5 and a reenforced T-portion 7 which may be threaded as shown in Fig. 1 to receive a threaded pipe.

Referring now particularly to Figs. 2 through 12, the formation of the fitting 1 from a sheet of metal is progressively illustrated. As shown in Figs. 2 and 3 a straight blanking and drawing operation is first performed on a relatively thick piece of sheet metal 9 to form a circular depression 11 having a horizontal base portion 13 which retains, substantially, the thickness of the original sheet 9. The depression 11 also has as an inclined wall 15 and a wall 17 opposite the inclined side 15. The inclined side 15 is slightly thinner than the original plate 9. The circular depression has an upper periphery 19.

Fig. 4 shows the depression 11 of Figs. 2 and 3 deepened by drawing out the walls 15 and 17 still farther by the same blanking and drawing operation, the base 13 retaining substantially all of its original thickness.

The next operation comprises forcing a portion 21 of the side wall 17 to the right, thereby drawing out the base 13 to a thickness thinner than that shown in Fig. 2. This operation may be carried out by means of split dies operated by a sub-press or hydraulic press. The bulge 21 thus formed is used as an anchor in the next operation which consists, as shown in Fig. 6, of forcing the base 13 still farther away from plane of the plate 9, thereby deepening the depression 11 and drawing out the sides 15 and 17 still thinner. It is noted that in all of these operations the initial dimension of the periphery 19 does not change.

In the next operation of forming as far as shown in Fig. 8, the base 13 is forced still farther down to provide the portion of the wall 17 between the bulge and the base 13. This is accomplished by a punching and hydraulic press operation. This same operation expands or draws out the base 13 to its full diameter and contracts the dimensions of the circumference of the top 19 of the circular depression 11 to conform with the diameter of the bottom 13, which, as shown in Fig. 8, is appreciably smaller than that of the initial periphery 19 of Fig. 2. Furthermore the slope of the side 15 is removed, and now all the portions of the stamping except the bulge 21 have been drawn out to substantially the same thickness.

The next operation, as shown in Fig. 9, by means of a hydraulic press operation forces the bulge 21 out to its proper length and completes the first stage of the general forming operation.

It is to be noted that an advantage of providing the base 13 with its original thickness during the initial stages of the formation of the fitting is that as the bulge is formed and the fitting shaped the base 13, by reason of its original thickness may be drawn out and caused to supply a part of the metal for the increased area of the fitting and at the same time to provide a more uniform thickness all over the portions of the fitting as it is finally formed. Thus a larger and stronger fitting may be fabricated.

The provision of the inclined wall 15 gives more room for the manipulation of the dies during the early steps of the formation of the fitting, without the necessity of providing a base 13 having dimensions larger than desired. Thus it is a simple operation to cut down the diameter of the periphery 19 when desired but it would be more difficult to cut down the diameter of the base 13.

The next operation is a trimming operation, in which, as shown in Figs. 10 and 11, the sheet 9 is cut off at the periphery 19, and the base portion 13 is also cut off. At this time the end of the bulge 21 is pressed in, broken and turned back to form a wall 27 against the side of the bulge 21 as shown in Fig. 12.

The next two steps in the process as shown progressively in Figs. 12 and 1 respectively consist in forming the fitting to the shape in which it is adapted to be used. Thus shoulders 23 and grooves 25 are formed in the fitting whereby entering pipes may be properly positioned in the fitting and sealing material may be introduced therein to join the piping and fitting.

The fitting as shown in Fig. 1 is now polished, or otherwise finally prepared for use.

The double folded portion 27 may be threaded and used for receiving heavier piping, such as iron piping or the like. The folded side 27 may or may not be soldered or otherwise joined to the outer side of the portion 21.

It is to be understood that during the formation of the fitting from the sheet metal it may be removed from the dies and annealed as required to prevent the metal from becoming hard and/or brittle.

If desired, the folded portion 27 may be cut off at the time of the trimming operation as the bottom 13 of the circular depression 11 was cut off or it may be desirable to retain the base portion 13 as an overlapped portion 27 as well as at the portion 21, in which case, rather than cutting off the base 13, it is punched in and broken as shown in Figs. 10 and 11. In this way the fitting 1 may be adapted to receive relatively light weight conduit in the receiving portion 3, and to receive relatively heavy conduit in the receiving portions 5 and 7.

Figure 14:
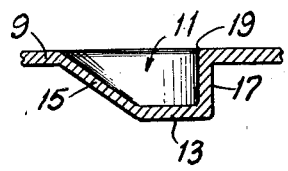
Fig. 14 is a vertical cross section of a stamping at an early stage in the formation of fitting of Fig. 13.
Figure 18:
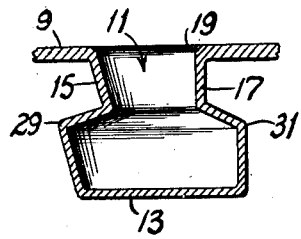
Figure 19:
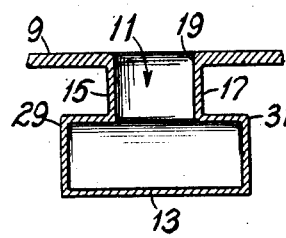
Figure 16:
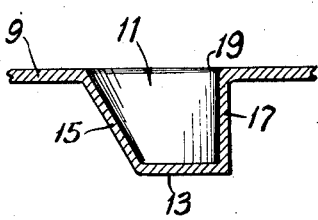

Referring now to Fig. 13 there is shown at numeral 1 a fitting similar to the fitting of Fig. 1 and having receiving portions or outlets 3, 5, and 7, but formed by a modified method. The fitting of Fig. 13 is, however, formed from sheet metal and is seamless. The views of Figs. 14 through 23 show progressively how the fitting of Fig. 13 is formed. The initial steps of the formation of the fitting of Fig. 13 are identical to those in the stamping of the fitting of Fig. 1. Thus the circular depression 11 is formed with the thick bottom wall 13, and with the sloping side wall 15 and the vertical wall 17 opposite the inclined wall 15. The diameter of the periphery 19 is substantially in the same proportion as shown in Fig. 2. As shown in Fig. 16, the circular depression 11 is further drawn out. The next operation departs from the first method, and instead of forming one bulge 21, two bulges 29 and 31 are formed respectively in the walls 15 and 17, thereby appreciably drawing out the base 13, Fig. 17. The next operation as shown in Figs. 18 through 20 comprises lengthening out the bulges 29 and 31 and the base 13 until as shown in Fig. 20 the bulges comprise the sides 29 and 31 having squared ends. Fig. 20 also shows the neck portion 33, between the portions 29 and 31, lengthened.

The ends of the bulges 29 and 31 are now trimmed off to form the outlets 3 and 5 and the sheet 9 is also cut off to form the outlet 7.

Then as before, and as shown in Figs. 13 and 23, the fitting of Fig. 22 is formed into its final shape, that which complies with the general characteristics disclosed in said Hill, Gresley and Mueller patents.

If it is desired to reenforce either one of the outlets 3 or 5 with the overlapping walls 27 it is only necessary to punch the ends of the bulges 29 and 31 in as shown in connection with Fig. 1. The outlet 7 may be reenforced by bending in a portion of the plate 9 to form the doubled edges 27. In this way the fitting may be adapted for joining relatively heavy piping.

As described in connection with the fabrication of the fitting of Fig. 1, the base 13 is initially provided with a thickness equal to that of the relatively thick plate in order that as the fitting is finally shaped, it will have a uniform thickness throughout its walls, except at the reenforced portions. Further the steps and means employed to carry out the steps are designed to effect a gradual distribution of the metal of the base 13 to the various portions, and to at all times keep the thickness of the other parts of the fitting substantially uniform.

These methods of thus drawing out fittings from sheet metal are not in any way limited to T-fittings but may be employed for other types of fittings such as elbows, couplings, nipples, special couplings, bushings, adaptors and the like.

An advantage of the methods of forming fittings is that they may be relatively inexpensively formed from sheet metal without the customary and distinctly undesirable seams.

Another advantage is that the walls of the fittings thus formed are relatively uniform in thickness by reason of the provision of the thick base 13 which cooperates with the sheet 9 to provide the necessary material for the expanding side walls. A further advantage is the provision of the smaller base and the inclined walls and the larger periphery 19 during the early steps of the formation, whereby ample room is provided for the manipulation of the dies without in any way interfering with the shape or quality of the finished article.

It will be understood that the machines required for carrying out the various operations are such as are known and that the invention lies in the operations and sequence of operations chosen for improvedly accomplishing the ends.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The method of forming a seamless fitting from sheet metal comprising forming a circular depression in a sheet of metal, the bottom of said depression being thicker than the sides thereof, and a portion of the side walls of said depression being perpendicular to the plane of said sheet metal, the other portion of said side walls being inclined to said plane, deepening said depression and forming a bulge in said perpendicular wall, expanding said bulge and bottom wall to form the general shape of the finished fitting, trimming the ends of said fitting and finally shaping said fitting.

2. The method of forming a seamless T-fitting comprising forming a depression in a sheet of relatively thick ductile metal, said depression having a relatively thick bottom wall and a side wall, part of which is substantially perpendicular to the plane of said sheet and part of which is inclined to said sheet, expanding said perpendicular side wall to form a bulge therein, deepening said depression below said bulge and expanding said bulge whereby the walls of said depression assume the general shape of said T-fitting, trimming the ends of said fitting and finally shaping the same.

3. The method of forming a seamless fitting from sheet metal comprising blanking and drawing out a depression in a sheet of metal, said depression having a sloping side wall whereby more room is provided in said depression for the manipulation of dies, and the bottom of said depression retaining substantially the thickness of said sheet, and further shaping said depression into the general shape of said fitting by drawing out said base to supply material for the walls of said fitting.

WARD M. ROBINSON.